United States Patent Office 3,500,924
Patented Mar. 17, 1970

3,500,924
SECONDARY RECOVERY PROCESS INVOLVING MOBILITY CONTROL
Fred H. Poettmann, Littleton, Colo., assignor to Marathon Oil Company, Findlay, Ohio, a corporation of Ohio
No Drawing. Filed Sept. 26, 1968, Ser. No. 762,982
Int. Cl. E21b 43/22
U.S. Cl. 166—274                            14 Claims

ABSTRACT OF THE DISCLOSURE

Improved process for recovering crude oil from an oil-bearing subterranean formation wherein a micellar dispersion is injected to displace the crude oil toward a production means, the improved process comprising injecting after the micellar dispersion a mobility buffer fluid containing sufficient amounts of surfactant in the front portion thereof to facilitate emulsification of the back portion of the micellar dispersion with the mobility buffer fluid. The mobility buffer fluid is preferably an aqueous medium containing sufficient mobility imparting agent to impart viscous stability to the flooding process. The micellar dispersion contains aqueous medium, hydrocarbon, surfactant, and optionally cosurfactant and/or electrolyte. The surfactant within the front portion of the mobility buffer fluid is desirably more hydrophilic than oleophilic.

BACKGROUND OF THE INVENTION

It is known that micellar dispersions are useful in secondary-type and tertiary-type recovery processes to efficiently recover oil from subterranean formations. Examples of such processes are defined in U.S. Patent Nos. 3,254,714; 3,266,570; 3,275,075; 3,297,084; and 3,301,325. The micellar dispersions contain surfactant, the purpose being, inter alia, to impart micellar characteristics. The prior art also teaches that a mobility buffer fluid (containing a mobility imparting agent to decrease the mobility) is useful in these flooding processes to maintain a favorable mobility condition.

Applicant has discovered a novel process of increasing the efficiency of such recovery processes by incorporating within the front portion of the mobility buffer fluid a small but sufficient amount of a surfactant to facilitate emulsification of the back portion of the micellar dispersion with the front portion of the mobility fluid.

DESCRIPTION OF THE INVENTION

The term "micellar dispersion" as used herein is meant to include micellar solutions, microemulsions, "transparent" emulsions (Blair, Jr. et al., U.S. Patent No. 2,356,-205), and micellar dispersion technology taught by C. G. Sumner, Clayton's, The Theory of Emulsions and Their Technical Treatment, Fifth Edition, pp. 315-320 (1954). Examples of micellar solutions are taught in U.S. Patent Nos. 3,254,714; 3,275,075; 3,301,325; 3,307,628; and 3,330,344. Micellar dispersions differ from emulsions in many ways, the strongest differentiation being that the former are thermodynamically stable systems and are generally transparent whereas emulsions are not thermodynamically stable and are generally opaque.

The micellar dispersions of this invention can be oil-external or water-external. Both types act like they are miscible with the formation fluids, i.e. the crude oil and interstitial water. From about 1% to about 20% formation pore volume are examples of useful amounts with this invention.

The micellar dispersion is composed essentially of hydrocarbon, aqueous medium (e.g. water, brackish water, and brine water), and surfactant sufficient to impart micellar characteristics to the dispersion. Preferably, cosurfactant(s) and optionally electrolyte(s) is incorporated into the dispersion. Examples of volume amounts include from about 4% to about 60% or more of hydrocarbon, from about less than 20% to about 90% aqueous medium, at least about 4% surfactant, from about 0.01% to about 20% of cosurfactant and from about 0.001% to about 5% or more (weight percent based on aqueous medium) of electrolyte. Based on economics, it is preferred that the micellar dispersion contain a large amount of water.

Examples of hydrocarbon include crude oil, partially refined fractions of crude oil and refined fractions thereof. Examples include side cuts from crude oil columns, crude column overheads, gas oils, kerosene, gasoline stocks, naphtha, and liquefied petroleum gases. Preferably, the hydrocarbon is crude oil or partially refined fractions of crude oil.

The aqueous medium can be soft, brackish, or brine water. Preferably, the water is soft but it can contain small amounts of salts which are preferably characteristic of the subterranean formation being flooded.

Surfactants useful with the dispersions include nonionic, cationic, and anionic surfactants. Examples of such surfactants include sodium glyceryl monolaurate sulfate, dihexyl sodium succinate, hexadecylnaphthalene sulfonate, diethyleneglycol sulfate, glycerol disulfoacetate monomyristate, p-toluidene sulfate laurate, p-chloroaniline sulfate laurate, sodium sulfato oleylethylanilide, triethanolamine myristate, N-methyltaurine oleamide, pentaerythritol monostearate, polyglycerol monolaurate, triethanolamine oleate, morpholine stearate, hexadecyl trimethylammonium chloride, ditetradecyl dimethyl ammonium chloride, n-dodecyl-diethyleneglycol sulfate, monobutylphenyl phenol sodium sulfate, and triethanolamine laurate or triethanolamine oleate. Other useful surfactants include Duponol WAQE (a 30% active sodium lauryl sulfate marketed by Du Pont Chemical Corporation, Wilmington, Del.), Energetic W–100 (a polyoxyethylene alkyl phenol marketed by Armour Chemical Company, Chicago, Ill.), Triton X–100 (an alkylphenoxy polyethoxy ethanol marketed by Rohm & Haas, Philadelphia, Pa.) and Arquad 12–50 (a 50% active dodecyl trimethyl ammonium chloride marketed by Armour Chemical Company, Chicago, Ill., and like materials.

Preferably, the surfactant is a petroleum sulfonate, also known as alkyl aryl naphthenic sulfonate, and preferably containing an alkali cation. The sulfonate molecule can contain more than one sulfur-containing grouping. Examples of preferred surfactants are the sodium and ammonium petroleum sulfonates having average molecular weights within the range of from about 350 to about 520, and more preferably from about 420 to about 470. The surfactant can be a mixture of at least low, medium, and high molecular weight sulfonates or a mixture of two or more different surfactants.

The cosurfactants, also known as cosolubilizers and semi-polar organic compounds useful with the invention include alcohols, amino compounds, esters, aldehydes, ketones, and like materials containing from 1 up to about 20 or more carbon atoms and more preferably from about 3 to about 16 carbon atoms. The cosurfactant is preferably an alcohol, e.g. isopropanol, n- and isobutanol, the amyl alcohols such as n-amyl alcohol, 1- and 2-hexanol, 1- and 2-octanol, decyl alcohols, alkaryl alcohols such as p-nonyl phenol and alcoholic liquors such as fusel oil. Concentrations of from about 0.01% to about 20% by volume of cosurfactant are useful in the micellar dispersion and more preferably from about 0.1 to about 5.0%. Mixtures of two or more cosurfactants are useful.

Examples of electrolytes include inorganic bases, inorganic acids, inorganic salts, organic bases, organic acids, and organic salts which are strongly or weakly ionized. Preferably, the electrolytes are inorganic bases, inorganic acids and inorganic salts, e.g. sodium hydroxide, sodium chloride, sodium sulfate, hydrochloric acid, sulfuric acid, and sodium nitrate. Examples of other useful electrolytes can be found in United States Patent No. 3,330,343. The type and concentration of electrolyte will depend on the aqueous medium, surfactant, cosurfactant, hydrocarbon and the reservoir temperature. Generally from about 0.001% to about 4% by weight (based on the aqueous medium) of electrolyte is useful. The electrolyte can be the salts within brackish or brine water.

The mobility buffer fluid should be compatible with the micellar dispersion and the drive material which follows the mobility buffer. In addition, the fluid should be compatible with the formation fluid. The fluid can be substantially hydrocarbon or substantially aqueous but is preferably the latter. The buffer fluid contains a mobility imparting agent sufficient to decrease the mobility of the fluid and desirably to give a mobility favorable to viscous stability throughout most of the flooding process. Polymers having molecular weights within the range of less than 100,000 to more than 10,000,000 and which are soluble in the majority of the buffer fluids are examples of useful agents. These agents are known in the art of secondary and tertiary recovery of hydrocarbon. An example of a particularly useful mobility imparting agent is high molecular weight, partially hydrolyzed, polyacrylamides.

The mobility of the micellar dispersions should be about equal to or less than that of the formation fluids (that is, the crude oil and water within the formation). In addition, the mobility of the mobility buffer fluid should be about equal to or less than that of the formation fluids and more preferably of that of the micellar dispersion. By maintaining this type of mobility in the process, a favorable flow characteristic, i.e. viscous stability, is imparted to the process to protect against fingering of drive material into the micellar dispersion.

After the mobility buffer fluid is injected into the formation, e.g. from about 10% to about 70% or more formation pore volume, drive material is injected. Drive material can be aqueous or hydrocarbon. Preferably, it is the cheaper and the one more compatible with the mobility fluid. Where the mobility buffer is an aqueous medium, the drive material is preferably aqueous medium.

The front portion of the mobility buffer fluid contains a small but sufficient amount of a surfactant to facilitate emulsification of the back portion of the micellar dispersion with the front portion of the mobility buffer fluid. Any surfactant capable of facilitating the emulsification is useful. Examples include anionic, cationic, nonionic, and amphoteric surfactants. The more water soluble surfactants identified earlier as useful in the micellar dispersion are specific examples. Preferably, the surfactant is a hydrophilic petroleum sulfonate having an average molecular weight within the range of from about 150 to about 450 and more preferably from about 200 to about 400. The sulfonate can contain unneutralized sulfonic acids, commonly referred to as green acids. Examples of other useful surfactants include water soluble alkyl, aryl and substituted alkyl and aryl sulfates, sulfonates, carbonates, amides, and like salts; condensates of ethylene oxide with a hydrophobic condensate of an alkyl oxide, e.g. propylene oxide, and an alkyl hydroxy compound, e.g. propylene glycol; and like materials. Where the mobility buffer fluid is aqueous, the surfactant is preferably more hydrophilic than oleophilic. However, where the mobility fluid is substantially hydrocarbon, the reverse of this may be desirable. Examples of useful amounts of surfactants in the mobility fluid include from about 0.1% to about 10% and more preferably from about 0.2% to about 5% by volume within the front portion, e.g. up to about 25%, of the mobility buffer fluid.

The surfactant should be compatible with the other components in the mobility buffer fluid, micellar dispersion, and formation fluids.

The following example is presented to illustrate working embodiments of the invention. Unless otherwise specified, percents are based on volume.

EXAMPLE

A stock solution containing 16% of an ammonium petroleum sulfonate (average molecular weight of about 420–440 and being about 62% active sulfonate) and 84% of straight-run gasoline is added to an aqueous brine, at a 40:60 volume ratio, respectively, containing 1, 4, and 8% sodium chloride (weight percent based on aqueous medium) and 0.3 gram of a surfactant indicated in the table per 60 ml. of the brine solution. The 40 ml. of stock solution and the 60 ml. of brine solution is agitated and then permitted to settle to obtain phase equilibrium. The amount of brine solution taken up by the stock solution is indicated as brine uptake. The numbers in the table indicate the percent of brine taken up by the stock solution. For example, 100 indicates an equal volume of brine is taken up by the stock solution. A brine solution containing no surfactant is present in the table as a reference sample.

TABLE

| Sample No. | Surfactant in brine solution (kind) | Type | Brine uptake 1% | 4% | 8% |
|---|---|---|---|---|---|
| A (reference) | | | 27.5 | 14 | 4 |
| B | Santomerse 85, a dodecyl benzene sodium sulfonate, mfg'd by Monsanto Chem. Co. | Anionic | 73.5 | 14.5 | 5.5 |
| C | Duponol ME 939, tech. grade sodium lauryl sulfate, mfg'd by E. I. du Pont de Nemours & Co. | do | 150 | 63 | 12 |
| D | Gantrez AN-119, a poly (methyl vinyl ether/maleic anhydride) mfg'd by General Aniline & Film Corp. Dyestuff & Chemical Div. | do | 30 | 12.5 | 7.5 |
| E | Brij 78 4-156, a polyoxyethylene stearyl ether, mfg'd by Atlas Chemical Ind. | Nonionic | 29 | 14 | 5 |
| F | Duponol WA 428, tech. grade sodium lauryl sulfate, mfg'd by E. I. du Pont de Nemours & Co. | Anionic | 95 | 34 | 9 |
| G | Duponol G 871, a fatty alcohol amine sulfate mfg'd by E. I. du Pont de Nemours & Co. | do | 57 | 30 | 12 |
| H | Calsoft F, a sodium sulfonate mfg'd by Pilot Chemical Co. | do | 112.4 | 26.7 | 7.5 |
| I | Span 65, sorbitan tristearate, mfg'd by Atlas Chemical Ind. | Nonionic | Completely emulsified | | |
| J | Deriphat 160-C, a partial sodium salt of N-lauryl beta iminodipropionate, mfg'd by General Mills, Inc. | Amphoteric | 48 | 22 | 16 |
| K | Boraxo, a sodium borate, mfg'd by United States Borax & Chemical Corp. | Anionic | 55 | 20 | 2.5 |

TABLE—Continued

| Sample No. | Surfactant in brine solution (kind) | Type | Brine uptake | | |
|---|---|---|---|---|---|
| | | | 1% | 4% | 8% |
| L | Pluronic F88, a condensate of ethylene oxide with a hydrophobic base formed by condensing propylene oxide with propylene glycol, mfg'd by Wyandotte Chemicals Corp. | Nonionic | 90 | 29.5 | 22.5 |
| M | Naccotan A, a condensed naphthalene sulfonate, mfg'd by Allied Chemical Corp. | Anionic | 45 | 12 | 3 |
| N | Deriphat 151, a sodium salt of N-coco beta amino propionate, mfg'd by General Mills, Inc. | Amphoteric | 27.5 | 10 | 10 |
| O | Naccosol-A, a sodium alkyl naphthalene sulfonate, mfg'd by Allied Chemical Corp. | Anionic | 150 | 58 | 10 |
| P | Cheelox-BF acid, an ethylene-diaminetetra-acetic acid, mfg'd by General Aniline & Film Corp. Dyestuff & Chemicals Div. | do | 32.5 | 12 | 7.5 |
| Q | Gafen FA-5, a dialkyl phenoxypoly-(ethyleneoxy)-ethanol, mfg'd by General Aniline & Film Corp. | Nonionic | 150 | 17.5 | 22.5 |

The above samples indicate that surfactant in the brine solution facilitates the take-up of brine solution in the stock solution.

This invention is not to be limited by specific embodiments taught herein. Rather, it is intended that all equivalents obvious to those skilled in the art be incorporated within the scope of this invention as defined in the specification and appended claims.

What is claimed is:

1. An improved process of recovering crude oil from an oil-bearing subterranean formation wherein a micellar dispersion is injected through an injection means into the formation to displace the crude oil toward a production means, the improved process comprising injecting into the formation after the micellar dispersion is injected therein a mobility buffer fluid characterized as having a small but sufficient amount of a surfactant in the front portion of the mobility buffer fluid to facilitate in emulsification of the back portion of the micellar dispersion with the front portion of the mobility buffer fluid.

2. The process of claim 1 wherein the micellar dispersion is comprised of aqueous medium, hydrocarbon, and surfactant.

3. The process of claim 2 wherein cosurfactant is incorporated into the micellar dispersion.

4. The process of claim 2 wherein electrolyte is incorporated into the micellar dispersion.

5. The process of claim 1 wherein the surfactant in the mobility buffer fluid is characterized as being more hydrophilic than oleophilic.

6. The process of claim 1 wherein the mobility buffer fluid is an aqueous medium containing sufficient amounts of mobility agent to impart a favorable mobility throughout at least most of the flooding process.

7. The process of claim 1 wherein the mobility buffer fluid contains from about 0.01% to about 10% of the surfactant in the front portion of the fluid.

8. The process of claim 7 wherein the mobility buffer fluid contains from about 0.2% to about 5% of the surfactant in the front portion of the fluid.

9. The process of claim 1 wherein the surfactant in the mobility buffer fluid is a petroleum sulfonate having an average molecular weight within the range of from about 150 to about 450.

10. The process of claim 9 wherein the average molecular weight of the sulfonate is within the range of from about 200 to about 400.

11. The process of claim 10 wherein the sulfonate contains unneutralized sulfonic acids.

12. The process of claim 9 wherein the sulfonate contains unneutralized sulfonic acids.

13. The process of claim 1 wherein the surfactant is nonionic.

14. The process of claim 1 wherein the surfactant is anionic.

References Cited
UNITED STATES PATENTS

| 3,254,714 | 6/1966 | Gogarty et al. | 166—274 |
| 3,266,570 | 8/1966 | Gogarty | 166—273 |
| 3,330,344 | 7/1967 | Reisberg | 166—274 |
| 3,406,754 | 10/1968 | Gogarty | 166—273 |
| 3,434,542 | 3/1969 | Dotson et al. | 166—273 |
| 3,437,141 | 4/1969 | Brandner et al. | 166—273 |

STEPHEN J. NOVOSAD, Primary Examiner

U.S. Cl. X.R.

166—273